United States Patent [19]

Inada et al.

[11] 3,973,806

[45] Aug. 10, 1976

[54] POWERED BRAKE SYSTEM FOR VEHICLES

[75] Inventors: Masami Inada, Toyoake; Toshiyuki Kondo, Toyota, both of Japan

[73] Assignee: Aisin Seiki Kabushiki Kaisha, Kariya, Japan

[22] Filed: Apr. 28, 1975

[21] Appl. No.: 572,314

Related U.S. Application Data

[63] Continuation of Ser. No. 415,813, Nov. 14, 1973.

[30] Foreign Application Priority Data

Nov. 14, 1972 Japan.............................. 47-114402

[52] U.S. Cl. ........................ 303/21 AF; 303/21 F; 303/84 R
[51] Int. Cl.² ............................................ B60T 8/02
[58] Field of Search.......... 303/10, 13, 21 AF, 21 F, 303/84 A, 84 R

[56] References Cited
UNITED STATES PATENTS

| | | | |
|---|---|---|---|
| 3,674,317 | 7/1972 | Mangold | 303/84 R UX |
| 3,727,988 | 4/1973 | Peruglia et al. | 303/21 FP X |
| 3,759,288 | 9/1973 | Kobashi | 303/84 A X |

*Primary Examiner*—Duane A. Reger
*Attorney, Agent, or Firm*—Oblon, Fisher, Spivak, McClelland & Maier

[57] ABSTRACT

A powered brake system for vehicles including wheel brake cylinders, a pump powered hydraulic pressure source, a reservoir hydraulically connected to the pump powered hydraulic pressure source, a main control valve interposed between the wheel brake cylinders and the pump powered hydraulic pressure source for controlling the fluid pressure to the wheel brake cylinders, a subcontrol valve interposed between the wheel brake cylinders and the main control valve for connecting the wheel brake cylinders to either one of the reservoir and the main control valve, and a safety valve interposed between the reservoir and the subcontrol valve for closing the communication between the reservoir and the subcontrol valve in the event of a failure of the pump powered hydraulic pressure source.

6 Claims, 5 Drawing Figures

POWERED BRAKE SYSTEM FOR VEHICLES

This is a continuation of application Ser. No. 415,813, filed Nov. 14, 1973.

BACKGROUND OF THE INVENTION

1. Field of the Invention

This invention relates generally to a brake system for vehicles and more particularly to a powered brake system for generating brake pressure by a pump driven by an engine.

2. Description of the Prior Art

In general, a main control valve for controlling the start and stop of a brake operation has the function of a master cylinder, and when the brake pressure cannot be generated as a result of failure of the pump, the brake pressure can be manually generated. In this system, a subcontrol valve is disposed between the main control valve and a wheel cylinder for controlling the fluid pressure to the wheel cylinder by connecting the wheel cylinder with the main control valve or a reservoir independently of the control of the main control valve. However, a subcontrol valve of the spool valve type is subject to wear and the fluid pressure leaks out from the subcontrol valve, such that there is in danger of causing a hindrance upon the manual brake operation and when the subcontrol valve is actuated in the manual brake operation, the brake operation cannot be performed due to insufficiency of fluid pressure.

SUMMARY OF THE INVENTION

It is therefore an object of the invention to provide an improved powered brake system for vehicles for obviating the above conventional drawback.

Another object of the present invention is to provide an improved powered brake system which includes safety valve means disposed within a circuit from a subcontrol valve to a reservoir and wherein the circuit is closed only upon manual brake operation.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
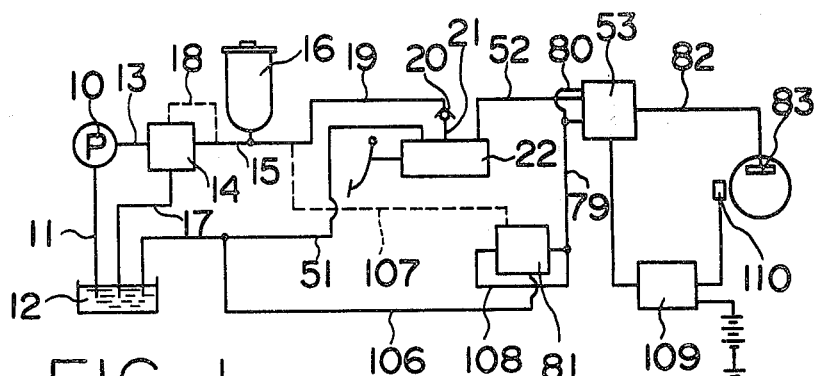
FIG. 1 is a schematic view of powered brake system constructed according to the invention.

Referring now to FIG. 1, a pump 10 driven by an engine, not shown, is connected with a reservoir 12 through a conduit 11 and with a charging valve 14 through a conduit 13. When the pump 10 is driven by the engine, the hydraulic fluid within the reservoir 12 is pumped and delivered to the charging valve 14 by the pump 10. The charging valve 14 is connected with the accumulator 16 through a conduit 15 and with the reservoir 12 through a conduit 17. An inlet port of the pilot pressure of the valve 14 is connected with the conduit 15 through a conduit 18. Thus, when the fluid pressure within the accumulator 16 does not attain a predetermined value, the hydraulic fluid from the pump 10 is transmitted to the accumulator 16, and when the fluid pressure within the conduit 15 attains a predetermined value, the hydraulic fluid from the pump 10 is sent back to the reservoir 12 through the charging valve 14. The accumulator 16 is connected with a check valve 20 through a conduit 19 and the check valve 20 is connected with a main control valve 22 through a conduit 21.

Now referring to a detail construction of the main control valve 22 (FIG. 2) which includes a valve body 23 having formed therein a cylinder 24 at one end thereof. A stepped cylinder 25 is in communication with one end of the cylinder 24 and is formed at the other end of the valve body. A piston 26 is slidably disposed within the cylinder 24, and a pressure piston 27 is slidably disposed within the cylinder 25. A plug 28 is threaded with the one end of the cylinder 25. Therefore, a chamber 29 is defined by the piston 26 and the pressure piston 27, and a chamber 30 is defined by the pressure piston 27 and the plug 28. The chamber 29 is in communication with an inlet port 31 mounted on the valve body 23 and the chamber 30 is in communication with an inlet and outlet port 32 mounted on the valve body 23, respectively. An annular groove 34 is in communication with an inlet port 33 which is mounted on the valve body 23, and is formed on the outer periphery at the central portion of the pressure piston 27. A stepped hole 35 axially penetrates the pressure piston 27 and a radial hole 36 connects the smaller diameter portion of the stepped hole 35 with the groove 34. One end of a piston 37 is slidably mounted on the smaller diameter portion of the stepped hole 35 and an annular groove 38 in communication with the hole 36 is defined on the outer periphery of the central portion of the piston 37. A valve body 39 is formed on the right end portion of the piston 37, and the valve body 39 is depressed in a leftward direction by a coil spring 40 inserted between the valve body 39 and the plug 28. In the event that the rightward depressing force on the piston 37 is not operated, the valve body 39 is seated on a valve seat 41 shaped on the pressure piston 27 and one end of the piston 37 projects outwardly from the one end face of the pressure piston 27. In the event that the rightward depressing force on the pressure piston 27 is not operated, one end face of the pressure piston 27 is in contact with the one end face of the larger diameter portion of the stepped cylinder 25 and the pressure piston 27 is held in the position shown in FIG. 2. The sliding resistance between the pressure piston 27 and the piston 37 is smaller than that between the pressure piston 27 and the valve body 23. A hole 42, which axially penetrates the piston 37 is defined on the piston 37 and one end of the hole 42 is shaped to form a valve seat 43. A spherical valve body 44, opposite the valve seat 43, is inserted into a cavity 45 formed on the other end face of the piston 27. Valve body 44 is constructed such that the outside diameter of the other end portion of the piston 26 is smaller then the smaller diameter portion of the stepped cylinder 25, and an extremity of a push rod 48, mechanically connected with a brake pedal 47, is inserted into a hole 46 shaped on the one end of the piston 26. The piston 26 is depressed in a leftward direction by a coil spring 49 arranged between the piston 26 and the other end face of the cylinder 24, and when the rightward depressing force on the piston 26 is not oeprated, one end of the piston 26 is held in the state shown in FIG. 2, i.e., one end of the piston 26 is in contact with a stopper 50 mounted on the valve body 23. The inlet port 33 of the main control valve 22 is connected with the checkvalve 20 through the conduit 21 and the outlet port 31 thereof is connected with the reservoir 12 through a conduit 51, and further the inlet and outlet port 32 thereof is connected with an inlet port 54 of a subcontrol valve 53 through a conduit 52.

Referring to a detail construction of the subcontrol valve 53 (FIG. 3) which includes a valve body 55 having a cylinder 56 at one end thereof and a cylinder 57 at the other end thereof. Within the cylinder 56, a spool 58 is slidably mounted and a chamber 59 is defined between one end of the cylinder 56 and the other end of the spool 58. A chamber 60 is defined between the other end of the cylinder 56 and one end of the spool 58. Two annular grooves 61, 62 are axially and separately provided on the outer periphery of the spool 58. A hole 63 axially penetrates through the spool and a radial hole 64 connects with the groove 61. A plug 66 having an orifice 65 formed therein is inserted into the other end of the hole 63. A groove 67 communicates with the groove 61, a groove 68 with the groove 62 and a groove 69 with either one of the grooves 61 or 62 depending upon the sliding movement of the spool 58. The groove 67 is connected with the inlet port 54 shaped on the valve body 55 and the groove 68 is connected with an inlet port 70 shaped on the valve body 55, and further the groove 69 is is connected with an inlet and outlet port 71 shaped on the valve body 55. A coil spring 72, disposed within the chamber 60, depresses the spool 58 in a leftward direction and the chamber 60 is in communication with a nozzle 73 projecting from one end face of the cylinder 57. A valve body 74, arranged against the nozzle 73 within the cylinder 57, is connected with the central portion of a plate spring 75 and is depressed toward the nozzle 73 by the plate spring 75. The valve body 74 is connected with a plunger 76 which is moved in a rightward direction when a solenoid 77 is conductive. The cylinder 57 is in communication with an outlet port 78 shaped on the valve body 55. As above-mentioned, the inlet port 54 of the subcontrol valve 53 is connected with the conduit 52, and the outlet ports 70, 78 are in communication with a safety valve 81 through conduits 79, 80, respectively, and further the inlet and outlet port 71 of the subcontrol valve 53 is connected with a wheel cylinder 83 through a conduit 82.

Referring now to a detail construction of the safety valve 81 (FIG. 4) which includes a first valve body 84 having formed therein a stepped cylinder 85. At the right end of the cylinder 85 is threaded a plug 86 and a valve seat 87 is arranged in the large diameter portion of the cylinder 85. A spherical valve body 88 is disposed at the right side of the valve seat 87. The valve body 88 is held by a retainer 89 slidably positioned by the plug 86 and is depressed in a leftward direction by a coil spring 90 interposed between the retainer 89 and the plug 86. An inlet port 91 is formed in the plug 86 and a hole 92, communicating the left side of the retainer 89 with the inlet port 91, is defined on the retainer 89. An axial passage 94 and a radial passage 95 connect the left side of the retainer 89 with an annular passage 93 shaped on the outer periphery of the valve seat 87, when the valve body 88 is released from the valve seat 87. The passage 93 is connected with an outlet port 96 defined on the valve body 84. Within a second valve body 97 connected with the left side of the first valve body 84 is formed a stepped cylinder 98 and the right end of the cylinder 98 is closed by the first valve body 84. A stepped piston 99 is arranged within the cylinder 98 with the central larger diameter portion thereof in contact with the smaller diameter portion of the cylinder 98. A chamber 100, defined on the left side of the larger diameter portion of the piston 99, is in communication with an inlet and outlet portion 101 shaped on the valve body 97. A spring retainer 102, inserted into the right side of the larger diameter portion of the piston 99, is arranged within the larger diameter portion of the cylinder 98, and a coil spring 103 is interposed between the retainer 102 and the valve body 84. The smaller diameter portion on the right of the piston 99 slidably penetrates the valve seat 87 and is extended into the passage 94. The right end portion of the piston 99 operatively contacts the valve body 88. The smaller diameter portion on the left of the piston 99 extends into a chamber 104 which is in communication with an inlet and outlet port 105 formed on the valve body 97. The diameter of the right and left portions of the piston 99 are the same. As mentioned above, the inlet port 91 of the safety valve 81 is connected with the conduit 79 and the outlet port 96 thereof is connected with the reservoir 12 through a conduit 106 and the conduit 51, and the inlet and outlet port 101 thereof is connected with the accumulator 16 through a conduit 107 and the conduit 19. The inlet and outlet port 105 thereof is further connected with the conduit 79 through a conduit 108. A computer 109 for anti-skid is connected with the solenoid 77 of the subcontrol valve 53, and a sensor 110 is provided for detecting rotation of vehicle wheels. In the event that the vehicle wheels are likely to be locked, the solenoid 77 of the subcontrol valve 53 is energized by the computer 109.

Figure 3:
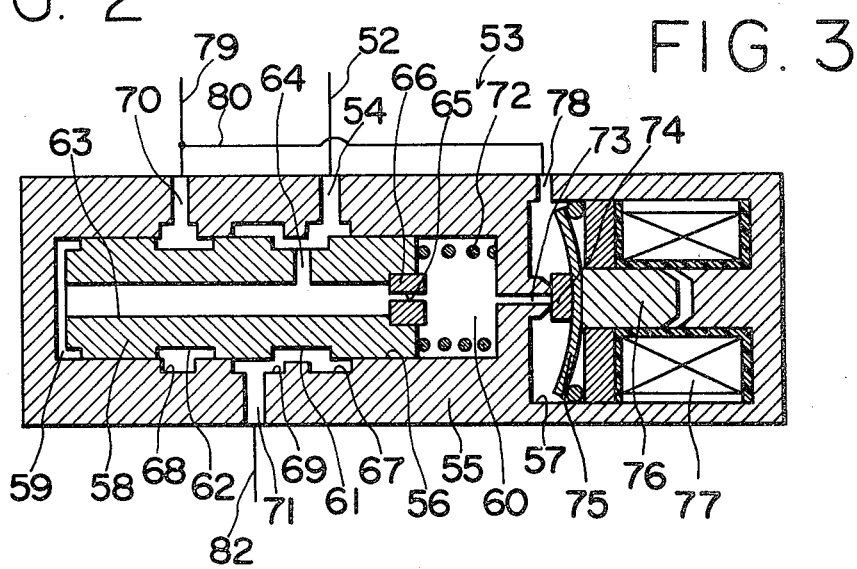
FIG. 3 is a similar view to FIG. 2, however, showing a subcontrol valve assembly 53 of FIG. 1.

In the normal running state of the vehicle, since the wheel rotation condition is normal, the solenoid 77 of the subcontrol valve 53 is not energized by the computer 109. Accordingly, the valve body 74 of the subcontrol valve 53 is moved in a leftward direction by the plate spring 75, as shown in FIG. 3, and the nozzle 73 is closed by the valve body 74, such that the fluid pressure in the two chambers 59, 60 becomes the same and the spool 58 is held by the spring 72 in the state shown in FIG. 3. Furthermore, the inlet port 54 is connected with the inlet and outlet port 71 through the grooves 67, 61 and 69, and the communication between the outlet port 70 and the inlet and outlet port 71 is interrupted. Therefore, the wheel cylinder 83 is connected with the inlet and outlet port 32 of the main control valve 22 through the conduit 82, the subcontrol valve 53 and the conduit 52. Since the brake pedal 47 is released, the valve body 39 of the main control valve 22 is seated on the valve seat 41 by the spring 40 and the valve body 44 is released from the valve seat 43 by the spring 49. The inlet and outlet port 32 is connected with the outlet port 31 through the chamber 30, the hole 42 and the chamber 29, and the inlet port 33 is blocked from the outlet port 31 and also from the inlet and outlet port 32. Therefore, the wheel cylinder 83 in communication with the inlet and outlet port 32 of the main control valve 22 is further connected with the reservoir 12 through the main control valve 22 and the conduit 51 and the fluid pressure within the wheel cylinder 83 is maintained at atmospheric pressure. On the other hand, the hydraulic fluid within the reservoir 12 is pumped by the pump 10 driven by the engine, not shown, through the conduit 11 and is delivered to the conduit 13. The hydraulic fluid delivered to the conduit 13 is transmitted to the accumulator 16 until the fluid pressure within the accumulator 16 attains a preset value. After the fluid pressure within the accumulator 16 attains a preset value, the fluid delivered to the conduit 13 is brought up to the reservoir 12, such that a fixed quantity of fluid is accumulated within the accumulator 16 under a preset pressure.

Figure 2:
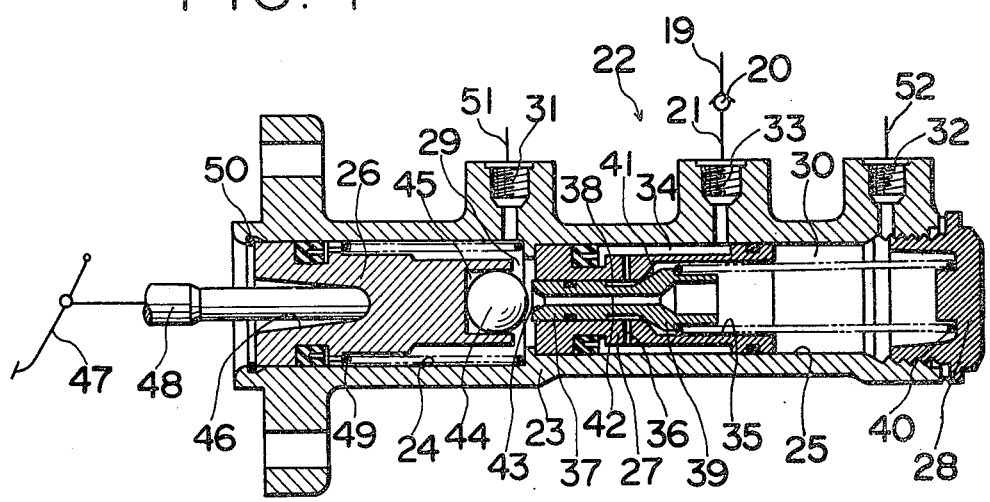
FIG. 2 is a vertical section view of a main control valve assembly 22 of FIG. 1.

In the event that the brake pedal 47 is depressed, the piston 26 of the main control valve 22 is moved by the push rod 48 in a rightward direction, as seen in FIG. 2, and the valve body 44 is then seated on the valve seat 43 and communication between the inlet and outlet port 32 and the outlet port 31 is cut off. The piston 37 is then moved against the spring 40 in a rightward direction, the valve body 39 is released from the valve seat 41, and the inlet port 33 is connected with the inlet and outlet port 32 through the groove 34, the hole 36, the groove 38 and the chamber 30. Accordingly, the pressurized fluid within the accumulator 16 is supplied to the wheel cylinder 83 through the conduit 19, the check valve 20, the main control valve 22, the conduit 52, the subcontrol valve 53 and the conduit 82, such that the fluid pressure within the wheel cylinder 83 is increased and the brake operation is performed. In this case, the piston 37 of the main control valve 22 is depressed by the fluid pressure of the wheel cylinder 83 in a leftward direction as seen in FIG. 2. When this depressing force and the forces of the springs 40, 49 become equal to the depressing force of the brake pedal 47, the valve body 39 is seated on the valve seat 41 and the pressurized fluid from the accumulator 16 is not applied to the wheel cylinder 83, so the increase of fluid to the wheel cylinder 83 is stopped. Namely, the fluid pressure of the wheel cylinder 83 corresponds to the depressing force of the brake pedal 47.

In the event that the vehicle wheels are likely to be locked as a result of the stepping force of the brake pedal 47 being too great, the anti-skid computer 109 causes current to flow into the solenoid 77 of the subcontrol valve 53. Therefore, the plunger 76 is displaced in a rightward direction as seen in FIG. 3, and the valve body 74 is released from the nozzle 73 opening the nozzle 73. Therefore, the fluid pressure within the chamber 60 is decreased and the spool 58 is moved in a rightward direction as seen in FIG. 3, such that communication between the inlet port 54 and the inlet and outlet port 71 are interrupted and the inlet and outlet port 71 is connected with the outlet port 70 through the grooves 69, 62 and 68. The wheel cylinder 83 is then in communication with the reservoir 12 through the conduit 82, the subcontrol valve 53, the conduit 79, the safety valve 81, the conduits 106 and 51 and the pressurized fluid within the wheel cylinder 83 is delivered to the reservoir 12 and the fluid pressure within the cylinder 83 is decreased such that the brake force against the vehicle wheels is diminished and locking of the vehicle wheels is released.

When locking of the vehicle wheels is released, the solenoid 77 of the subcontrol valve 53 is not energized by the computer for an anti-skid condition. Therefore, the subcontrol valve 53 returns again to the state of FIG. 3 and the wheel cylinder 83 is connected with the inlet and outlet port 33 of the main control valve 22. The pressurized fluid from the accumulator 16 is then provided to the wheel cylinder 83 and the brake operation against the vehicle wheels is performed.

When the brake pedal 47 is released, the main control valve 22 returns to the state of FIG. 2 and the pressurized fluid within the wheel cylinder 83 is delivered to the reservoir 12 through the conduit 82, the subcontrol valve 53, the conduit 52, the main control valve 22 and the conduit 51 and the fluid pressure within the wheel cylinder 83 is decreased and the brake operation is released.

The above-mentioned operation is the normal state wherein fluid pressure of a prearranged value exists in the accumulator 16. However, the brake operation where the fluid pressure within the accumulator 16 is decreased below the prearranged value, for example, by the failure of the pump 10, will be described hereinbelow.

Figure 4:
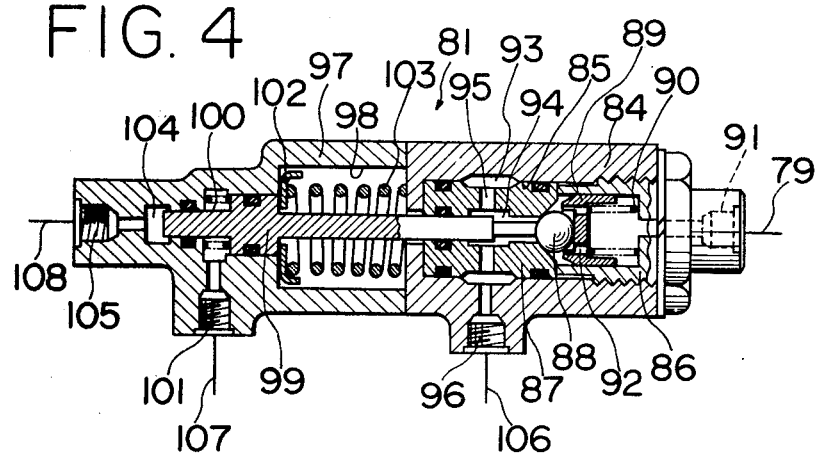
FIG. 4 is a similar view to FIG. 2, however, showing a safety valve assembly 81 of FIG. 1.

When the fluid pressure within the accumulator 16 falls below the prescribed value, the fluid pressure within the chamber 100 of the safety valve 81 falls, such that the piston 99 is moved in a leftward direction, as viewed in FIG. 4, and the valve body 88 is seated upon the valve seat 87 by the spring 90, and the communication between the inlet port 91 and the outlet port 96 are closed.

In the event that the brake pedal 47 is depressed, the piston 26 of the main control valve 22 is displaced in a rightward direction as viewed in FIG. 2, and the valve body 44 is seated on the valve seat 43. The piston 37 is then integrally displaced with the piston 26 in a rightward direction and the valve body 39 is released from the seat 41. The valve body 44 is then brought into contact with the pressure piston 27 and the pressure piston 27 is integrally displaced with the pistons 26, 37 in a rightward direction and the capacity of the chamber 30 is decreased. Therefore, the fluid within the chamber 30 is pressurized by the depressing force of the brake pedal 47 and the pressurized fluid within the chamber 30 is supplied to the inlet and outlet port 32, the conduit 52, the subcontrol valve 53 and the conduit 82 and the brake operation is performed. During the brake operation, the fluid within the groove 62 of the subcontrol valve 53 may leak out into the groove 62 through the sliding faces between the spool 58 and the valve body 55, and yet communication between the conduits 79, 106 is completely closed, such that the above-mentioned leakage of fluid within the groove 62 does not actually occur.

Figure 5:
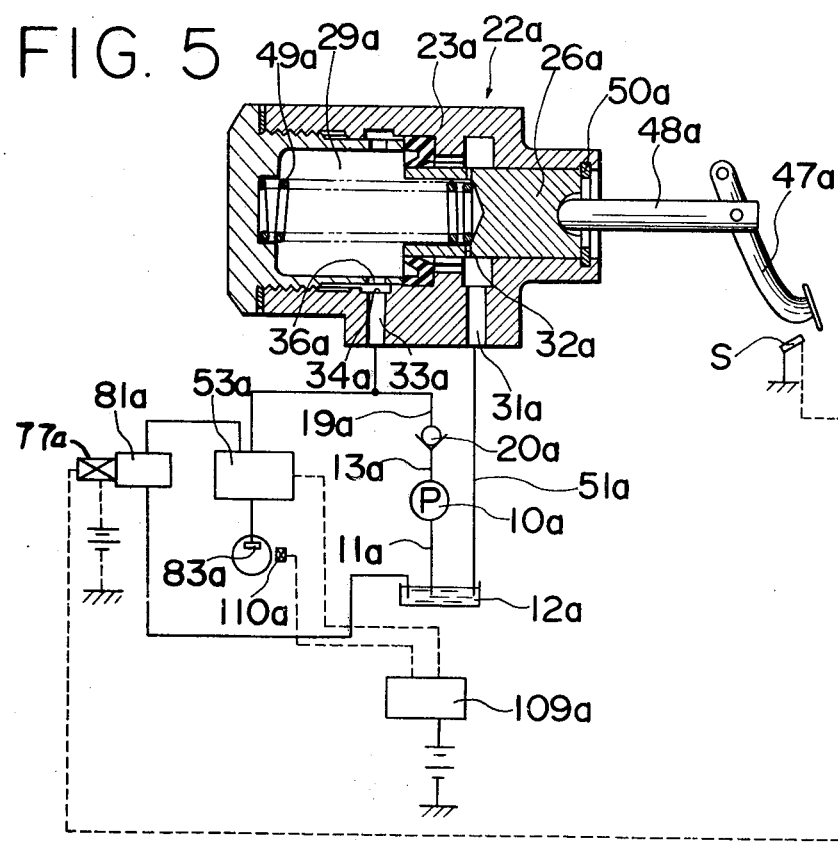
FIG. 5 is a schematic view of a powered brake system constructed according to the invention, however, showing another embodiment.

Referring now to FIG. 5 showing another embodiment of the present invention wherein the suffix a is attached to like parts as in the first embodiment, a pump 10a driven by an engine, not shown, is connected with the reservoir 12a through a conduit 11a and with an inlet port 33a of a main control valve 22a and an inlet port 54a of a subcontrol valve 53a through conduits 13a, 19a. The subcontrol valve 53a is quite the same as in the aforementioned embodiment and an inlet port 71a of the subcontrol valve 53a is communicated with the wheel cylinder 83a through a conduit 82a and an outlet port 70a thereof is communicated with the reservoir 12a through a safety valve 81a. The safety valve 81a is a solenoid valve 77a which is in contact with a switch S actuated by a brake pedal 47a. When the switch S is closed, the solenoid 77a is actuated and communication between the outlet port 70a of the subcontrol valve 53a and the reservoir 12a is interrupted. A valve piston 26a is slidably disposed within a valve body 23a of the main control valve 22a and is depressed by a spring 49a in the leftward direction. The valve piston 26a is retained in the valve body 23a by a stopper 50a fixed to the valve body 23a and the right end face of the valve piston 25a is secured to the end of a push rod 48a connected with the brake pedal 47a. The inlet port 33a, defined on the valve body 23a is connected with a chamber 29a through a groove 34a and a hole 36a and an outlet port 31a, defined on the valve body 23a, is connected to the reservoir 12a through a conduit 51a. A hole 32a connects the chamber 29a with the outlet portion 31a when the valve piston 26a is in the position shown in FIG. 5. Hole 32a is formed on the valve piston 26a and is closed by the valve body 23a, when the brake pedal 47a is depressed and the valve piston 26a is displaced in a leftward direction. When the stroke of the brake pedal 47a is greater than the stroke which is required for closing the hole 32a, the switch S is closed by the movement of the brake pedal 47a. The reference numeral 109a is a computer for anti-skid and is contacted with a solenoid 77a of the subcontrol valve 53a and a sensor 110a.

In the normal running state of the vehicle, the valve piston 26a of the main control valve 22a is held by a spring 40a, as shown in FIG. 5, and the inlet port 33a and the outlet port 31a of the main control valve 22a are in communication. Accordingly, the fluid pumped from the reservoir 12a by the pump 10a is brought back to the reservoir 12a through a check valve 20a and the main control valve 22a and the fluid pressure within the conduit 19a between the check valve 20a and the main control valve 22a is at atmospheric pressure. Therefore, the subcontrol valve 53a connects the wheel cylinder 83a with the inlet port 33a of the main control valve 22a, although the brake operation is not performed.

When the brake pedal 47a is depressed, the valve piston 26a of the main control valve 22a is displaced in a leftward direction by the push rod 48a and the hole 32a is partially blocked, so that fluid pressure occurs within the conduit 19a from the pump 10a to the inlet port 33a of the main control valve 22a and is applied to the wheel cylinder 83a through the subcontrol valve 53a and the brake operation is performed.

In the event that the vehicle wheels are likely to be locked during the brake operation, the subcontrol valve 53a is actuated by the computer 109a for anti-skid and the subcontrol valve 53a connects the wheel cylinder 83a with the reservoir 12a through the safety valve 81a, so the tendency for the vehicle wheels to be locked is released.

Should failure of the pump 10a occur, the fluid pressure will not be in the inlet port 33a of the main control valve 22a, even if the valve piston 26a of the main control valve 22a is displaced in a leftward direction and the hole 32a becomes partially blocked, so that the brake pedal 47a is further depressed. The valve piston 26a is then further displaced in a leftward direction and the hole 32a is thoroughly closed and the capacity of the chamber 29a is decreased, and the fluid within the chamber 29a is pressed by the depressing force of the brake pedal 47a and is supplied from the inlet port 33a to the wheel cylinder 83a through the subcontrol valve 53a and the brake operation is performed. In such brake operation, the switch S is closed by the brake pedal 47a. Thereby, the safety valve 81a is activated and communication between the outlet port 70a and the reservoir 12a is closed and the hydraulic fluid within the conduits 19a, 13a from the main control valve 22a to the wheel cylinder 83a is prevented from leaking out to the reservoir. Accordingly, the brake operation is performed.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the U.S. is:

1. A powered brake system for vehicles comprising:
   wheel brake cylinders;
   a pump powered hydraulic pressure source;
   a reservoir hydraulically connected to said pump powered hydraulic pressure source;
   main control valve means interposed between said wheel brake cylinders and said pump powered hydraulic pressure source for controlling the fluid pressure to said wheel brake cylinders;
   subcontrol valve means interposed between said wheel brake cylinders and said main control valve means for alternatively connecting said wheel brake cylinders to either one of said reservoir and said main control valve means for performance of an anti-skid control operation as required; and
   safety valve means interposed between said reservoir and said subcontrol valve means, including a valve member for controlling the communication between said reservoir and said subcontrol valve means according to a failure of said pump powered hydraulic pressure source, and a control member for controlling said valve member according to said failure to said pump powered hydraulic pressure source.

2. A powered brake system for vehicles as set forth in claim 1 wherein said safety valve means is a hydraulically acutated valve.

3. A powered brake system for vehicles as set forth in claim 1 wherein said safety valve means is an electromagnetically actuated valve.

4. A powered brake system for vehicles as set forth in claim 2 wherein said safety valve means comprises a first valve body having a first cylinder, a valve means disposed within said first cylinder for controlling the fluid communication between said subcontrol valve means and said reservoir, a spring means urging said valve means in a closed direction, a second valve body having a second valve cylinder, a piston slidably arranged within said second valve cylinder for opening said valve means according to fluid pressure from said pump powered hydraulic pressure source, and spring means urging said valve means in a closed direction through said piston.

5. A powered brake system for vehicles as set forth in claim 1, wherein said control member comprises:
   a piston for controlling said valve member according to fluid pressure from said pump powered hydraulic pressure source; and
   spring means biasing said valve member in a closed direction through said piston.

6. A powered brake system for vehicles as set forth in claim 1, wherein said control member comprises:
   a solenoid means for controlling said valve member according to said failure to said pump powered hydraulic pressure source.

* * * * *